United States Patent [19]

Umeda et al.

[11] Patent Number: 5,180,525
[45] Date of Patent: Jan. 19, 1993

[54] PROCESS FOR PRODUCING GRANULAR FIRE RETARDANT

[75] Inventors: Kazuyoshi Umeda, Mihara; Funiaki Nakamoto, Onomichi, both of Japan

[73] Assignee: Teijin Chemicals, Ltd., Tokyo, Japan

[21] Appl. No.: 768,193

[22] PCT Filed: Feb. 14, 1991

[86] PCT No.: PCT/JP91/00174

§ 371 Date: Oct. 11, 1991

§ 102(e) Date: Oct. 11, 1991

[87] PCT Pub. No.: WO91/12295

PCT Pub. Date: Aug. 22, 1991

[30] Foreign Application Priority Data

Feb. 14, 1990 [JP] Japan ................................. 2-33349

[51] Int. Cl.$^5$ ..................... C09K 21/14; C09K 21/08; C08K 5/04; C08K 5/41
[52] U.S. Cl. .................................. 252/609; 252/604; 524/281
[58] Field of Search ............... 252/604, 609; 524/281

[56] References Cited

U.S. PATENT DOCUMENTS

| | | | |
|---|---|---|---|
| 3,778,528 | 12/1973 | Heifz et al. | 174/48 |
| 3,875,107 | 4/1975 | Nouvertné et al. | 260/37 PC |
| 3,876,580 | 4/1975 | Nouvertné et al. | 260/37 PC |
| 4,123,587 | 10/1978 | Wesch et al. | 428/407 |
| 4,170,711 | 10/1979 | Orlando et al. | 568/610 |
| 4,371,650 | 2/1983 | Rosenquist et al. | 524/162 |
| 4,530,880 | 7/1985 | Taniuchi et al. | 428/402 |
| 4,721,583 | 1/1988 | Poisson et al. | 252/609 |
| 4,849,134 | 7/1989 | Georlette et al. | 252/607 |
| 4,987,269 | 1/1991 | Petri | 568/720 |
| 5,047,498 | 9/1991 | Petri | 528/202 |

*Primary Examiner*—Richard D. Lovering
*Assistant Examiner*—Bhat N.
*Attorney, Agent, or Firm*—Sherman and Shalloway

[57] ABSTRACT

A process for producing a granular fire retardant, which comprises melt-extruding a halogenated carbonate compound of particular structure having a specific viscosity of 0.015–0.10 by the use of an extruder and then immediately cutting the extrudate into granules.

4 Claims, No Drawings

PROCESS FOR PRODUCING GRANULAR FIRE RETARDANT

TECHNICAL FIELD

The present invention relates to a process for producing a granular fire retardant consisting of a halogenated carbonate compound having excellent processability, workability and heat resistance.

BACKGROUND ART

Polybutylene terephthalate, ABS resin, etc. are in wide use in electric and electronic parts, machine parts, automobile parts and other applications, for their excellent properties. These thermoplastic resins, however, are inherently flammable and accordingly their application fields are restricted. Hence, a halogenated polycarbonate oligomer was proposed as a flame retardant for said resins.

In order to impart fire retardancy to a thermoplastic resin, it has conventionally been necessary to mix a thermoplastic resin ordinarily of pellet or chip form with a fire retardant and, as necessary, other additives and melt-extrude the resulting mixture by the use of an extruder to obtain a fire-retardant thermoplastic resin of pellet form. However, the above fire retardant is a very fine powder, and accordingly this invites poor processability such as generation of layer separation and bridging at the hopper portion of extruder, insufficient biting by the screw portion, and the like; as a result, the fire retardant has a drawback in that its uniform mixing is difficult and the final product obtained has low quality. Further, the fire retardant has a drawback of poor workability; for example, the fire retardant becomes dust by itself, significantly deteriorating the working environment. Furthermore, the fire retardant contains a considerable amount of the solvent (methylene chloride) used in the production thereof, and there is a fear that the solvent may adversely affect the quality of the final product obtained. In order to improve the above-mentioned poor processability and workability, Japanese Laid-Open Patent Publication No. 149738/1987 proposes a granulation method wherein a halogenated hydrocarbon type fire retardant is cold-powderized under pressure. However, to granulate a halogenated polycarbonate oligomer by the above granulation method employing cold powderization under pressure, there are drawbacks in that a large pressure of 100–2,000 kg/cm$^2$ is required and further the granules obtained are easily disintegrated during transportation or working.

OBJECT OF THE INVENTION

The object of the present invention is to provide a process for producing a granular fire retardant consisting of a halogenated carbonate compound having excellent workability, processability and heat resistance.

The present inventors made extensive study in order to achieve the above object and, as a result, found that a halogenated carbonate compound having a particular specific viscosity can be easily granulated by melt-extruding it by the use of an extruder and then immediately cutting the extrudate and that the solvent content in the granules obtained can be reduced to such a level as to pose no problem. The finding has led to the completion of the present invention.

DISCLOSURE OF THE INVENTION

The present invention resides in a process for producing a granular fire retardant, characterized by melt-extruding a halogenated carbonate compound having at least one unit represented by the following general formula (i)

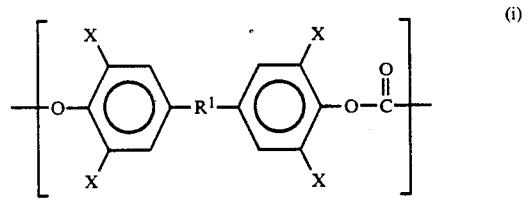

(X is a bromine atom or a chlorine atom, and R$^1$ is an alkylene group of 1–4 carbon atoms, an alkylidene group or —SO$_2$—) and having a specific viscosity of 0.015–0.10, by the use of an extruder and then immediately cutting the extrudate into granules.

The halogenated carbonate compound used in the present invention is a compound having a unit represented by the general formula (i). As the halogenated bisphenol which is a constituent of the unit, there can be mentioned 2,2-bis(3,5-dibromo-4-hydroxyphenyl)propane, 2,2-bis(3,5-dichloro-4-hydroxyphenyl)propane, bis(3,5-dibromo-4-hydroxyphenyl)methane, 1,1-bis(3,5-dibromo-4-hydroxyphenyl)ethane, bis(3,5-dibromo-4-hydroxyphenyl)sulfone, etc. 2,2-Bis(3,5-dibromo-4-hydroxyphenyl)propane which is called tetrabromobisphenol A, is particularly preferable.

It is possible to use, in combination with the halogenated bisphenol, an ordinary unhalogenated bisphenol, for example, 2,2-bis(4-hydroxyphenyl)propane, bis(4-hydroxyphenyl)sulfone or bis(4-hydroxyphenyl)methane. When an unhalogenated bisphenol is used in combination with the halogenated bisphenol, it is preferable to use it in an amount of ordinarily 40 mole % or less based on the total bisphenols. In this case, there may be included carbonates consisting of unhalogenated bisphenols, and oligomers thereof, both formed as by-products.

The halogenated carbonate compound used in the present invention has a specific viscosity of 0.015–0.10, preferably 0.015–0.08. A halogenated carbonate compound having a specific viscosity less than 0.015 has a low melt viscosity, making difficult its cutting immediately after melt extrusion. A halogenated carbonate compound having a specific viscosity more than 0.10 requires a high melting temperature and has a high halogen content, causing thermal decomposition and resultant coloring.

Such a halogenated carbonate compound can be produced, for example, by reacting a halogenated bisphenol and a carbonate precursor (e.g. phosgene). In this case, an end-blocking agent may be used. A preferable end-blocking agent is a halogen atom- or organic group-substituted or unsubstituted aromatic monohydroxy compound.

To the halogenated carbonate compound may be added, as necessary, at least one of such additives as auxiliary fire retardant, antioxidant, heat stabilizer, ultraviolet absorber, lubricant, release agent, coloring agent including dye and pigment, nucleating agent and the like, to such an extent that the object of the present invention is not impaired.

In the melt-extrusion of the halogenated carbonate compound, it is preferable to control the temperature of the melt ordinarily at a range from a temperature 10° C. higher than the melting point to a temperature 60° C. higher than the melting point. As the melt extruder, any desired melt extruder of single-screw type or double-screw type can be used. However, a double-screw type extruder is preferable and a vented double-screw extruder is particularly preferable.

In the present invention, the extruded melt is immediately cut into granules. In this case, in order to protect the obtained granules from fusion-bonding to each other, it is preferable to cool the granules by any desired method such as pressurized air cooling, water cooling or the like. An in-water cutting method may also be employed.

INDUSTRIAL APPLICABILITY

The granular halogenated carbonate compound obtained by the present invention has good processability, resultantly can be dispersed uniformly, and does not invite the quality deterioration of the final resin product obtained. The halogenated carbonate compound further has good workability and does not adversely affect the working environment. Furthermore, the solvent content in the granules obtained is reduced to such a level as to pose no problem.

BEST MODE FOR CARRYING OUT THE INVENTION

The present invention is hereinafter described in detail with reference to Examples. The properties shown in the Examples were measured according to the following methods.

(1) Specific viscosity

Measured in a 0.7 g/dl methylene chloride solution (20° C.).

(2) Melting point

Measured by a melting point microtester and expressed as a temperature range from a temperature at which about half of a sample is melted, to a temperature at which the whole portion of the sample is melted.

(3) Methylene chloride content 3 g of a sample is weighed accurately and heated at 250° C. for 2 hours; then, 1 ml of the generated gas is taken and analyzed by gas chromatography; the methylene chloride content of the sample is determined using a calibration curve.

(4) Heat resistance 30 mg of a sample is weighed accurately and TGA is conducted at a temperature elevation rate of 20° C./min at a nitrogen flow rate of 40 ml/min. The heat resistance of the sample is expressed as a temperature at which 5 % weight reduction takes place.

EXAMPLES 1-7 AND COMPARATIVE EXAMPLES 1-2

Each of halogenated carbonate compounds A-H of fine powder form as shown in Table 1 was melt-extruded at a cylinder temperature as shown in the table, by the use of a 30 φ double-screw extruder; each extrudate was immediately cut into granules and simultaneously sprayed with pressurized air to obtain cooled granules. The properties of each fine powder used, the temperature of each melt at the time of melt extrusion, and the properties of granules obtained were shown in Table 1.

The fine powders A-H shown in the table are as follows.

A, D, F, G and H: Each a brominated carbonate compound obtained from tetrabromobisphenol A, phosgene and tertbutylphenol (end-blocking agent).

B: A fine powder obtained by compounding 0.1 % by weight of trimethyl phosphate (stabilizer) to the fine powder A.

C: A brominated carbonate compound obtained from tetrabromobisphenol A, bisphenol A (50 mole % relative to tetrabromobisphenol A), phosgene and tetrabromophenol (end-blocking agent).

E: A brominated carbonate compound obtained from tetrabromobisphenol A, phosgene and tetrabromophenol (endblocking agent).

TABLE 1

| | Fine powder | | | | | Extrusion conditions | | |
| --- | --- | --- | --- | --- | --- | --- | --- | --- |
| | Type | Specific viscosity | Melting point (°C.) | $CH_2Cl_2$ content (ppm) | Heat resistance (°C.) | Cylinder temperature (°C.) | Melt temperature (°C.) | Use of vent |
| Example 1 | A | 0.046 | 230–240 | 2480 | 447 | 240 | 275 | Not used |
| Example 2 | A | 0.046 | 230–240 | 2480 | 447 | 240 | 275 | Used |
| Example 3 | B | 0.046 | 230–240 | 2480 | 447 | 240 | 280 | Used |
| Example 4 | C | 0.018 | 175–180 | 1050 | 438 | 180 | 220 | Not used |
| Example 5 | D | 0.032 | 210–215 | 1600 | 448 | 210 | 240 | Not used |
| Example 6 | E | 0.030 | 215–222 | 3700 | 467 | 220 | 250 | Used |
| Example 7 | F | 0.072 | 255–275 | 1850 | 441 | 250 | 290 | Not used |
| Comparative Example 1 | G | 0.013 | 160–175 | 2650 | 432 | 170 | 210 | Not used |
| Comparative Example 2 | H | 0.13 | 280–295 | 1950 | 465 | 280 | 320 | Not used |

| | Granules | | | | |
| --- | --- | --- | --- | --- | --- |
| | Specific viscosity | Melting point (°C.) | $CH_2Cl_2$ content (ppm) | Heat resistance (°C.) | Coloring |
| Example 1 | 0.047 | 228–238 | 340 | 451 | Substantially colorless |
| Example 2 | 0.048 | 230–240 | 150 | 452 | Substantially colorless |
| Example 3 | 0.049 | 227–237 | 160 | 455 | Substantially colorless |
| Example 4 | 0.018 | 173–178 | 210 | 445 | Substantially colorless |
| Example 5 | 0.033 | 210–215 | 410 | 453 | Substantially |

TABLE 1-continued

| | | | | | |
|---|---|---|---|---|---|
| Example 6 | 0.032 | 213–220 | 100 | 476 | colorless<br>Substantially colorless |
| Example 7 | 0.073 | 255–275 | 250 | 445 | Light brown |
| Comparative Example 1 | | Cutting was impossible | | | |
| Comparative Example 2 | 0.13 | 275–290 | 250 | 467 | Dark brown |

We claim:

1. A process for producing a granular fire retardant, characterized by melt-extruding a halogenated carbonate compound having at least one unit represented by the following general formula (i)

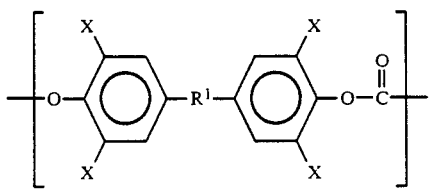

(X is a bromine atom or a chlorine atom, and $R^1$ is an alkylene group of 1–4 carbon atoms, an alkylidene group or $-SO_2-$) and having a specific viscosity of 0.015–0.10, by the use of an extruder and then immediately cutting the extrudate into granules.

2. The process for producing a granular fire retardant according to claim 1 which comprises melt-extruding the halogenated carbonate compound having at least one unit represented by said formula (i) at a temperature ranging from 10° C. to 60° C. above the melting point of the halogenated carbonate compound in a double-screw extruder and immediately following the extruder cutting and cooling the extrudate into cooled granules.

3. The process for producing a granular fire retardant according to claim 1 wherein the halogenated carbonate compound has a specific viscosity of 0.015 to 0.08.

4. The process for producing a granular fire retardant according to claim 1 wherein the halogenated carbonate compound comprises at least one unit obtained from 2,2-bis(3,5-dibromo-4-hydroxyphenyl)propane.

* * * * *